Figure 1:
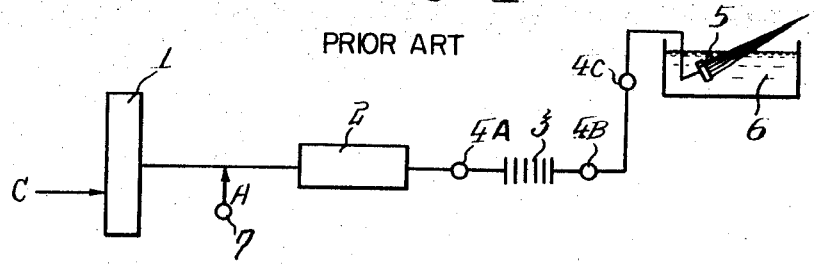

United States Patent [19]
Sakita et al.

[11] 3,864,502
[45] Feb. 4, 1975

[54] METHOD FOR PREPARING PROTEIN FOOD PRODUCT

[75] Inventors: Takashi Sakita; Gyoto Taguchi, both of Yokohama, Japan

[73] Assignee: Nisshin Seiyu Kabushiki Kaisha, Tokyo, Japan

[22] Filed: June 16, 1972

[21] Appl. No.: 263,444

[30] Foreign Application Priority Data
Mar. 8, 1972 Japan.............................. 47-23792

[52] U.S. Cl.................................. 426/364, 426/276
[51] Int. Cl. .............................................. A23j 3/00
[58] Field of Search ..................... 99/14, 17, 18, 20; 264/202; 260/112; 426/364, 276

[56] References Cited
UNITED STATES PATENTS
2,682,466  6/1954  Boyer...................................... 99/14

*Primary Examiner*—James R. Hoffman
*Attorney, Agent, or Firm*—Anthony A. O'Brien

[57] ABSTRACT

A food product is formed continuously from protein curd by mixing with an alkaline solution in an in-line mixing means, filtering, and extruding through a spinerette. A portion of the mixed solution from the output of the in-line mixer is returned to the input of the in-line mixer. The remaining portion of the mixed solution is passed to an open tank between the output of the mixer, and from the open tank, is pumped through a filter to prevent upset of the mixing process due to pressure backup at the filter.

1 Claim, 3 Drawing Figures

METHOD FOR PREPARING PROTEIN FOOD PRODUCT

The present invention relates to a process for preparing a food product from edible protein, and more particularly to a process for producing fiberous food products from edible protein by dissolving in a alkaline solution, filtering, and extruding through a spinerette.

In the prior art process of preparing fibrous foodstuff from protein containing substances of vegetable or animal origin, for example from defatted soybeans, undissolved protein tends to remain in the solution being treated, in a dissolving process in which a sufficient amount of alkaline solution is added to the protein which has been separated from raw substances by an extraction and precipitation process, thereby clogging up the filter means to which the treated protein is directed. Hence, a normal operating filter pressure of 42.7 pounds per square inch will be increased gradually to a value of 85.3 to 99.5 pounds per square inch, at which value the filtering operation has to be stopped. When the filtering pressure is unduly high, it will affect the process of preparing the spinning solution to the extent that a balance of the curd and the alkaline solution fed into the process will be upset until a predetermined processing condition is no longer maintained, thereby rendering the process unsatisfactory before the filtration is stopped. The present invention has been devised to overcome the above-mentioned disadvantages of the prior art process.

Object of the present invention is to provide a process of preparing the spinning solution which sufficiently dissolves the protein curd separated from raw substance to prevent the filter from being clogged up, thereby permitting the process of preparing the spinning solution to be carried out continuously in steady condition for a relatively long period of time.

Another object of the present invention is to provide a process of preparing the spinning solution permitting the process to be carried out continuously without being affected by a high pressure occurring upstream of the filter even if the filter is clogged up.

According to the present invention, there is provided a process of preparing the spinning solution, comprising a mixing protein curd and alkaline solution and returning at least one portion of the protein curd and the alkaline solution discharged out of delivery side of the mixer means to the suction side of the mixer means, thereby causing said one portion of the fluid being treated to be recirculated through the mixer means.

Figure 2:
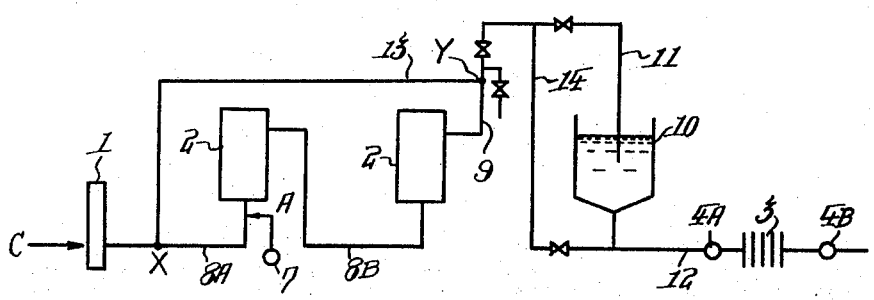
Figure 3:
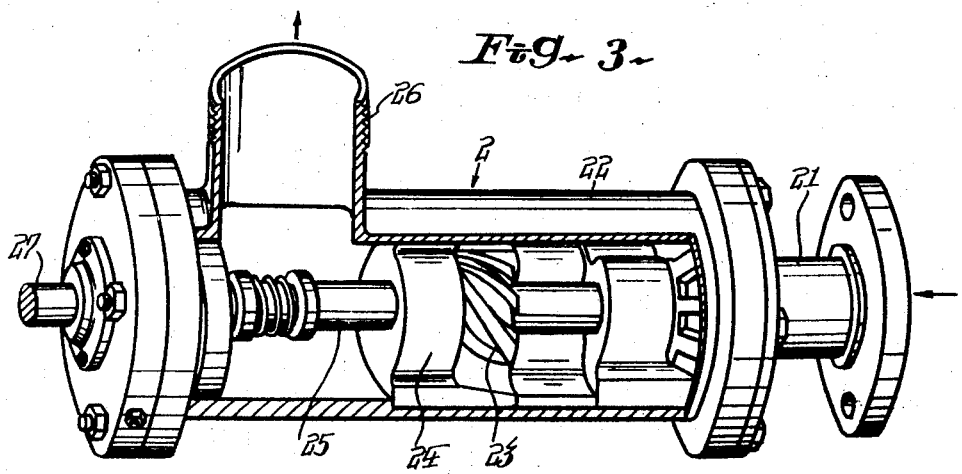

Now, one preferred embodiment according to the present invention will be described in detail by way of example hereinafter with reference to accompanying drawings, in which FIG. 1 is a block diagram showing the prior art process of preparing the spinning solution from the protein curd, FIG. 2 is a diagrammatic representation showing the process of preparing the spinning solution according to the present invention, and FIG. 3 is a perspective view showing a typical mixer means employed in the process according to the present invention.

Referring to FIG. 1, there is illustrated a prior art process of preparing the spinning solution in which the protein curd separated from a raw substance is cooled down by cooling means 1 and fed to an input line of an inline mixer means 2 which is also supplied with a alkaline solution from a suitable source 7 so as to be dissolved into the alkaline solution to form a spinning solution. Pump mechanism 4a applies the mixed spinning solution from the mixer 2 to a filter 3. Pump mechanism 4b and 4c connect the output of the mixer 2 to a spinerette 5 to extrude the filaments of the mixed solution in a coagulating bath 6 to form fibrous products which then may be extended if necessary. In this process since all the steps are carried out within enclosed pipes and casings, there will be no bubble produced in the spinning solution which may cause a cut filament to occur. However, the dissolving operation is not carried out sufficiently in the in-line mixer to eliminate undissolved substances which could clog up the filter 3. Therefore, it is practically difficult to continue the dissolving operation for a long period of time due to a high pressure generated within the filter. Normally, the operation has to be stopped to replace the filter five to twenty hours after the operation is commenced.

FIG. 2 shows a process for preparing the spinning solution according to the present invention, in which the curd C fed into the in-line mixer 2 through a feed line 8A is mixed up with the alkaline solution A injected into the line 8A from a supply source 7 to form the spinning solution and then discharged into a discharge pipe 9. Two sets of in-line mixers 2, 2 are connected together by means of a pipe 8B in FIG. 2. However, the number of in-line mixers incorporated into the system may be changed suitably. One feature of the present invention resides in that at least one portion of the solution being treated is returned from the discharge pipe 9 to the supply line 8A of the in-line mixer 2 upstream from the source 7 by means of a returning pipe 13. In this embodiment, thirty (30) to sixty (60) per cent of the solution discharged out of the delivery side of mixer means 2 is returned to the suction side of the same by the returning pipe 13. Hence, one portion of the solution will be circulated through a joint X between the suction line 8A and the returning line 13, in-line mixers 2, 2, the discharge pipe 9, a branch point Y where the returning line 13 branches off, and the returning line 13 and brought back to the joint X. When one portion of the solution is circulated as described hereinabove, the protein curd will be sufficiently dissolved into the alkaline solution to eliminate undissolved curd which will clog up the filter means 3, thereby enabling the dissolving process to be continued for a long period of time. For instance, in case of the process according to the present invention, the period of operation can be prolonged to three to five times that of the prior art process. Another advantage of the process having one portion of the solution circulated through the mixer is that a total number of mixer means can be reduced, should a multiplicity of mixer means be required.

According to the present invention, an open tank 10 is provided between the branch point Y on the discharge line 9 from the in-line mixer and the filter means 3, as shown in FIG. 2. The open tank 10 is connected to the discharge line 9 of the in-line mixer 2 by means of a pipe 11 and to the filter means 3 by a length of pipe 12 and has a surface of the solution therein exposed to atmosphere. Accordingly, even though a high pressure is produced within the pipe 12 due to clogging of the filter means 3, it will not affect the operation of the process of preparing the spinning solution carried out in a system including the in-line mixer. As described hereinabove, since the branch point Y on the discharge pipe 9 is connected directly to the suction line 8A of the inline mixer 2 by means of the return pipe 13, any high pressure at the branch point Y which is possibly transmitted from the pipe 12, should the latter be connected hermetically with the former, tends to be immediately imposed on the fluid within the suction pipe 8A, thereby upsetting a balance of protein curd and the alkaline solution fed into the line 8A and causing a disorder of the operation. The open tank 10 according to the present invention serves to prevent such kind of disorder from occurring, so as to enable the dissolving process of preparing the spinning solution to be carried out continuously in steady condition.

FIG. 3 shows a typical in-line mixer means employed in the present invention. The in-line mixer includes a casing 22 having an inlet pipe 21 and outlet pipe 26, and an impeller 23 rotatably mounted within the casing 22. A rotatable shaft 25 of the impeller 23 is connected to a suitable motor (not shown) by means of an intermediate shaft 27. A stator 24 is mounted within the casing 22 so as to cooperate with the impeller 23.

EXAMPLE

Spinning solution, free from undissolved carbohydrates, having a protein content of 15.7% and a pH value of 12.5 was obtained by adding caustic soda solution to the protein curd from soybeans with one half of admixture being circulated through the in-line mixer. When this spinning solution was first filtrated with the open tank eliminated by means of line 14 and valves in lines 11 and 14, the pressure upstream the filter means was raised from a value of 45.0psi to 76.5psi in 52 hours, and, at the latter pressure, a balance of protein curd and the caustic soda fed into the system was upset, with the pH value of the spinning solution raised to 13.0. Then, when the open tank was connected to the system and the pH value of the spinning solution restored to the normal value of 12.5, the dissolving process continued 63 hours before the filtrating pressure was raised to 86.5psi, at which pressure the filtrating operation was stopped. When both the circulation process and the open tank according to the present invention have been eliminated, the dissolving process was stopped due to the unbalance of the curd and alkaline solution fed into the system after 14 hours.

What is claimed is:

1. A process of preparing a spinning solution comprising mixing a protein curd and an alkaline solution from an input line in an inline mixing means wherein the mixture of protein curd and alkaline solution is pressurized and passed to an outlet line of the inline mixing means, passing a portion of the pressurized mixture of protein curd and alkaline solution from the outlet line of the inline mixing means through a first pipe back to the input line of the inline mixing means, passing the remaining portion of the pressurized mixture of protein curd and alkaline solution from the outlet line of the inline mixing means through a second pipe into an open tank, passing the mixture of protein curd and alkaline solution in the open tank into a third pipe, filtering the mixture of protein curd and alkaline solution in the third pipe by applying the mixture of protein curd and alkaline solution in the third pipe under pressure to one side of a filter means to form a filtered mixture of protein curd and alkaline solution on the other side of the filter means, and passing the filtered mixture of protein curd and alkaline solution from the other side of the filter means to a spinerette means.

* * * * *